United States Patent [19]
Shine

[11] Patent Number: 6,094,858
[45] Date of Patent: Aug. 1, 2000

[54] APPARATUS FOR DISPENSING AND LAYING A SHEET OF FILM MATERIAL

[76] Inventor: Samuel James Shine, Tuogh, Adare, County Limerick, Ireland

[21] Appl. No.: 09/142,427

[22] PCT Filed: Mar. 3, 1997

[86] PCT No.: PCT/IE97/00013

§ 371 Date: Aug. 31, 1998

§ 102(e) Date: Aug. 31, 1998

[87] PCT Pub. No.: WO97/31523

PCT Pub. Date: Sep. 4, 1997

[30] Foreign Application Priority Data

Mar. 1, 1996 [IE] Ireland .................................. S960192

[51] Int. Cl.[7] .................................................. A01G 13/02
[52] U.S. Cl. .............................. 47/1.01 R; 47/9; 111/102
[58] Field of Search .............................. 47/1.01 R, 9, 56; 111/100, 102, 144; 172/19, 20

[56] References Cited

U.S. PATENT DOCUMENTS

| | | | |
|---|---|---|---|
| 4,092,936 | 6/1978 | Griffin et al. ................................. | 47/9 |
| 4,285,161 | 8/1981 | Kawasaki et al. ........................... | 47/9 |
| 4,771,570 | 9/1988 | Nyboer ........................................ | 47/9 |
| 4,888,913 | 12/1989 | Hoeft ........................................... | 47/9 |
| 5,165,351 | 11/1992 | Billings .................................. | 47/56 X |

FOREIGN PATENT DOCUMENTS

| | | | |
|---|---|---|---|
| 102385 | 8/1965 | Denmark ...................................... | 47/9 |
| 0172077 | 2/1986 | European Pat. Off. . | |
| 0281451 | 9/1988 | European Pat. Off. . | |
| 2427780 | 6/1978 | France ......................................... | 47/9 |
| 2452871 | 10/1980 | France . | |
| 2580459 | 10/1986 | France . | |
| 2 617674 | 1/1989 | France ......................................... | 47/9 |
| 2693625 | 1/1994 | France . | |
| 49993 | 6/1967 | Luxembourg . | |
| 1 339 270 | 11/1973 | United Kingdom ......................... | 47/9 |
| 2130063 | 5/1984 | United Kingdom ......................... | 47/9 |

*Primary Examiner*—Peter M. Poon
*Assistant Examiner*—Jeffrey L. Gellner
*Attorney, Agent, or Firm*—Sughrue, Mion, Zinn, Macpeak & Seas, PLLC

[57] ABSTRACT

Apparatus for dispensing a sheet of film material (5) from a roll (2) and laying the film material (5) on the ground subsequent to sowing seeds by a seed sower (3), the apparatus comprising a main framework (6), a secondary framework (10) connected to the main framework (6), a pair of spaced-apart ground engaging wheels (15) rotatably mounted on the secondary framework (10), a receiving means for the roll (2), the ground engaging wheels (15) being located for engaging the roll (2) adjacent the ends (18) thereof for rotating the roll (2) and acting as a dispensing and laying means for dispensing film (5) from the roll (2) and laying the film (5) over the ground.

18 Claims, 13 Drawing Sheets

APPARATUS FOR DISPENSING AND LAYING A SHEET OF FILM MATERIAL

FIELD OF THE INVENTION

The present invention relates to apparatus for dispensing a sheet of film material from a roll and laying the film material on the ground subsequent to sowing seeds by a seed sower so that the film material covers the area where the seeds have been sown. In particular, the invention relates to such apparatus for use in the sowing of maize, although the invention is not limited to such apparatus.

BACKGROUND OF THE INVENTION

Apparatus for dispensing sheet film material from a roll and laying the film material on the ground are known. For example, U.S. Patent Specification No. 4,092,936 discloses a device, particularly for tobacco seed, in which seed tape is laid on the soil, covered with sheet material and the edges of the sheet material urged into open furrows or cavities. The device disclosed is a combined sowing and covering device specifically for use with seed tape carrying tobacco seeds.

French Patent Specification No. 2,580,459 discloses an apparatus for dispensing a sheet of film material from a roll. The relative locations of the roll of plastics film material and the wheels of the device result in a device with a tendency to stretch the plastics film material. In addition, the device of the prior art requires the use of an unrolling roller and is subject to disruption on uneven surfaces resulting in damage to the plastics material.

Moreover, recent developments in maize sowing demands tile use of extremely fine gauge plastics sheet material incompatible with the devices of the prior art. More particularly, many of the devices of the prior art are specifically designed to stretch the entire surface of the plastics sheet material being dispensed which can result in damage or tearing of the plastics material.

Accordingly, a need exists for an apparatus for dispensing and laying a sheet of film material which avoids undesirable stretching of the film material.

An object of the invention is to provide an apparatus for dispensing and laying a sheet of film material adaptable to the soil surface.

SUMMARY OF THE INVENTION

According to the invention there is provided apparatus for dispensing a sheet of film material from a roll and laying the film material on the ground subsequent to sowing seeds by a seed sower, the apparatus comprising a main framework, a main mounting means on the main framework for mounting the apparatus rearwardly of the seed sower relative to the direction of motion of the seed sower, a secondary framework connected to the main framework, a pair of spaced apart ground engaging wheels rotatably mounted on the secondary framework, a rotatable idler means rotatably mounted on the secondary framework, and forming with the ground engaging wheels a receiving means for the roll, the ground engaging wheels being located on the secondary framework on the roll adjacent the ends thereof for rotating the roll, the ground engaging wheels acting as a dispensing and laying means for dispensing film from the roll and laying the film over the ground, a pair of forwardly mounted spaced apart front coulters for forming a pair of respective furrows in the ground for engagement by the ground engaging wheels so that the ground engaging wheels locate side edges of the film in the respective furrows, and a pair of rearwardly mounted spaced apart rear coulters for closing the furrows for entrapping the side edges of the film material therein.

In one aspect of the invention the ground engaging wheels are freely rotatably mounted on the secondary framework so that, as the apparatus is trailed over the ground, the ground engaging wheels rotate for dispensing and laying the film on the ground.

Preferably, the receiving means for the roll comprises a cradle for receiving a roll. The receiving means for the roll is disposed forwards of the ground engaging wheels.

Advantageously, the main framework is pivotably mountable relative to the seed sower about a main pivot axis for permitting pivotal movement of the apparatus about the main pivot axis to accommodate uneven ground. The main pivot axis extends substantially horizontally in a general longitudinal direction parallel to the direction of motion.

Suitably, the secondary framework is pivotally connected to the main framework about a secondary pivot axis to facilitate pivotal movement of the secondary framework relative to the main framework about the secondary pivot axis for accommodating uneven ground. Preferably, the secondary pivot axis (14) comprises a substantially horizontal secondary pivot axis (14) extending substantially transversely of the direction of motion.

The idler means preferably comprises a pair of spaced apart idler rollers rotatably mounted on the secondary framework for rollably engaging the roll. Suitably, the idler rollers are located adjacent to, but spaced apart from, the ground engaging wheels.

Advantageously, a pressure means is provided for urging the film material into engagement with the ground engaging wheels.

Suitably, the pressure means is located adjacent the ground engaging wheels at a location just before the ground engaging wheels urge the film material into the respective furrows. Preferably, the pressure means comprises a pair of pressure rollers rotatably mounted on the secondary framework for engaging respective ground engaging wheels.

The invention also optionally comprises support means for supporting the sheet material between the ground engaging wheels.

Suitably, the support means comprises at least one transverse bar.

Preferably, the at least one bar is mounted below the rotational axis of the ground engaging wheel adjacent the perimeter of the ground engaging wheel so that sheet material can pass between the bar and the ground engaging wheel.

Suitably, at least one support wheel is disposed between the ground engaging wheels for supporting sheet material between the ground engaging wheels.

Advantageously, at least one support wheel is adapted to stretch sheet material.

Preferably, the apparatus further comprises punching means for punching sheet material. Suitably, a first punching means is adapted to puncture plant holes in said sheet material.

Preferably, a second puncturing means is adapted to puncture water is holes in sheet material. Suitably, the puncturing means are mounted adjacent the pressure means.

The apparatus preferably further comprises a cutting means for cutting a sheet from a roll.

Suitably, the cutting means comprises an elongate blade mounted on the secondary framework and having a cutting edge engageable transversely of the sheet material, the blade being movable between an idle position and a cutting position for severing the sheet material intermediate the roll and the ground.

Advantageously, the sheet material is severable in a forwards motion of the blade between the idle and cutting positions.

The invention also comprises a drive means for urging the cutting means between the idle and the cutting positions. Suitably, the drive means comprises a hydraulic ram.

Advantageously, the apparatus further comprises biasing means to bias the cutting blade in the idle position.

Suitably, the cutting means displaces soil between the cutting and idle positions.

In a preferred embodiment of the invention mud flaps are disposed rearwards of the ground engaging wheels.

Preferably, the apparatus of the invention is adapted for mounting rearwardly of a seed sower.

The invention will be more clearly understood from the following description of an embodiment thereof which is given by way of example only with reference to the accompanying drawings in which:

DETAILED DESCRIPTION OF THE INVENTION

Figure 1:
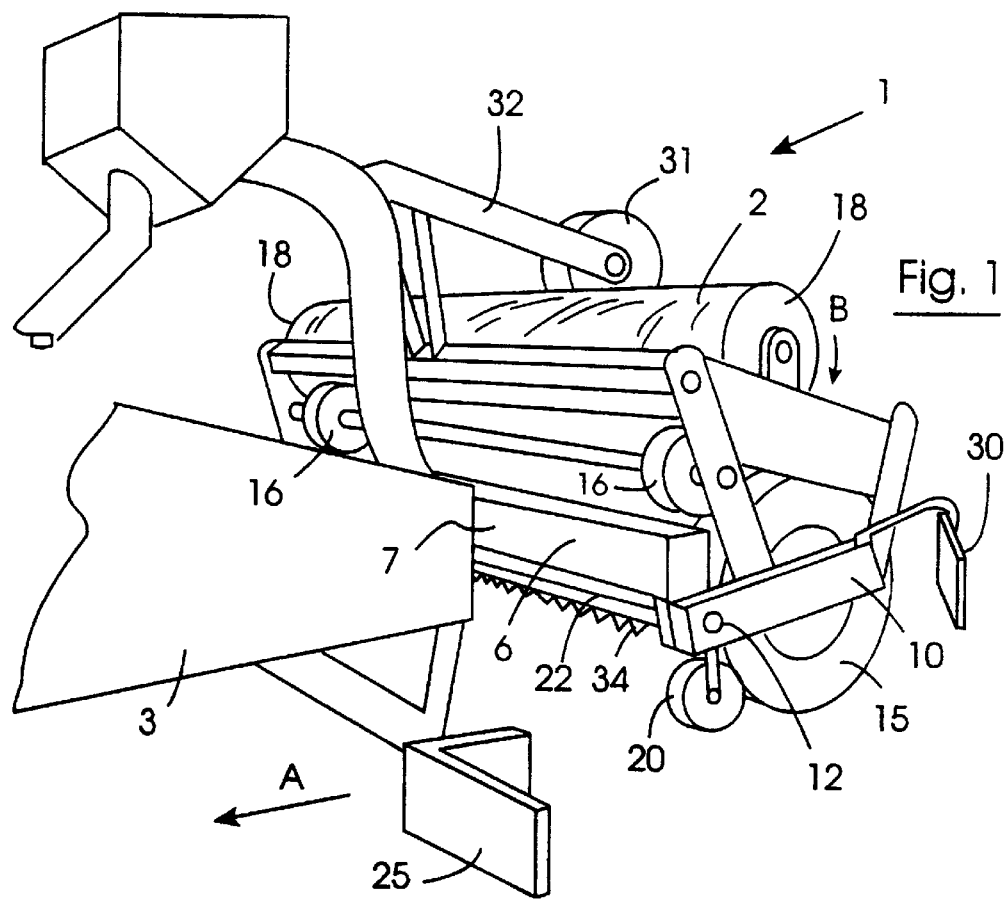
FIG. 1 is a side perspective view, partially cut away, of apparatus according to the invention for dispensing a film from a roll, and for laying the film on the ground.
Figure 2:
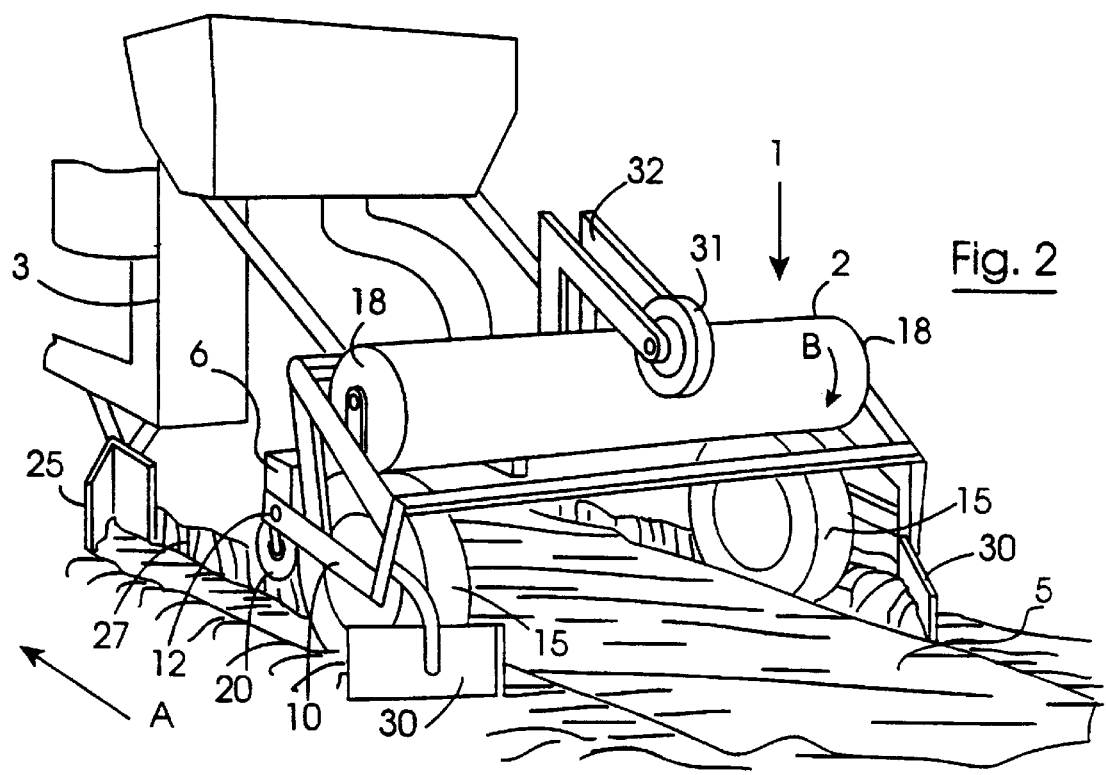
FIG. 2 is a perspective view of the apparatus of FIG. 1 shown from the rear.

Referring to the drawings and initially to FIGS. 1 to 7 there is illustrated apparatus according to the invention indicated generally by the reference numeral 1 for mounting rearwardly of a seed sower 3, which is illustrated only in block representation, and which is in turn mounted to a three point linkage of a tractor (not shown). The apparatus 1 is suitable for dispensing film material 5 from a roll 2 and laying the film 5 on the ground for covering an area in which maize seeds are sown by the seed sower 3. The apparatus 1 is mounted directly to the rear of the seed sower 3 relative to the direction of motion of the seed sower 3, which is indicated by the arrow A. The mounting of the apparatus 1 to the seed sower 3 is described below. In this embodiment of the invention the film 5 is a relatively thin, clear plastics material which is suitable for maintaining heat in the soil to accelerate germination and initial growth of the maize seed.

The apparatus 1 comprises a main framework 6, which in this embodiment of the invention comprises a main transversely extending carrier bar 7. A main mounting means comprising a main pivot mounting 8 which extends from the carrier bar 7 pivotally connects the apparatus 1 to the seed sower 3 so that the apparatus 1 can oscillate or is pivotable about a main pivot axis 9 defined by the main pivot mounting 8. The main pivot axis 9 extends substantially horizontally and longitudinally parallel to the direction of motion of the seed sower 3, namely parallel to the direction of the arrow A.

A secondary framework 10 is carried on the main framework 6, and is connected thereto by a secondary mounting means, in this case, a pair of secondary pivot mountings 12 which pivotally connect the secondary framework 10 to the main framework 6. The secondary pivot mountings 12 define a common secondary pivot axis 14 which extends substantially horizontally and transversely of the direction of motion of the seed sower 3.

A pair of ground engaging wheels 15 are rotatably carried at spaced apart locations on the secondary framework 10 and are rotatable about a common rotational axis. An idler means comprising a pair of idler rollers 16, are also rotatably carried on the secondary framework 10. The idler rollers 16 are located adjacent to, but spaced apart from, the ground engaging wheels 15, and form with the ground engaging wheels 15 a receiving means, namely, a receiving area or cradle for receiving the roll 2. The ground engaging wheels 15 are located on the secondary framework 10 so that they engage the respective ends 18 of the roll 2. Thus, as the ground engaging wheels 15 are rotated by trailing the apparatus 1 along the ground, the roll 2 is rotated in the direction of the arrow B. and film material 5 is urged from, and dispensed from the roll 2 by the ground engaging wheels 15.

A pressure means, in this case provided by a pair of pressure rollers 20, which are rotatably mounted on the secondary framework 10 urge the side edges of the film 5 into engagement with the ground engaging wheels 15 just above the ground. Although not illustrated, the pressure rollers 20 are carried on spring-urged mounting members which are pivotally connected to the secondary framework 10, and spring-urged into engagement with the ground engagement wheels 15. A support means comprising three support bars 22 extend between the ground engaging wheels 15 adjacent the periphery thereof for supporting the film material intermediate the ground engaging wheels 15 between the roll 2 and the ground.

A pair of spaced apart front coulters 25 are mounted on the seed sower 3, but if desired could be mounted on the apparatus 1 forwardly of the ground engaging wheels 15, for forming respective furrows 27 in the ground for engagement by the ground engaging wheels 15. Accordingly, as the ground engaging wheels 15 dispense the film 5 from the roll 2 onto the ground, the ground engaging wheels 15 also locate the side edges of the film 5 in the furrows 27. A pair of rear coulters 30 carried on the secondary framework 10, and mounted rearwardly of the ground engaging wheels 15 close the furrows 27 for entrapping the side edges of the film 5 in the furrows 27 for securely retaining the film material on the ground.

A retaining means, in this embodiment of the invention a retaining wheel 31, which is carried on a spring-loaded pivotally mounted arm 32 retains the roll 2 in engagement with the ground engaging wheels 15 and the idler rollers 16. The pivot arm 32 is pivotally connected to the secondary framework 10.

A cutting means for cutting the film 5 from the roll 2 comprises an elongated knife 34 which extends transversely of the direction of motion of the seed sower 3, and which is movable from an idle position into a cutting position whereby the knife 34 extends between two of the support bars 22 for cutting the film 5. An hydraulic ram (not shown) is mounted on the secondary framework 10 for urging the knife 34 from the idle to the cutting position and vice versa. A mounting mechanism (not shown) mounts the knife in the secondary framework 10 so that it is movable from the idle to the cutting position. The knife 34 is provided with a serrated cutting edge, and cuts the film by virtue of the fact that the film 5 is in tension between the roll 2 and the ground.

The seed sower 3, in this embodiment of the invention, is an ACCORD seed sower which is capable of sowing three spaced apart rows of maize seed between the ground engaging wheels 15 of the apparatus 1.

Although not illustrated, in practice, a pair of seed sowers 3 will be mounted side by side behind the tractor, and a pair of apparatus 1 will be mounted behind the seed sowers, one apparatus 1 for each seed sower 3.

In use, the seed sower 3 is mounted to the three point linkage of a tractor, and the apparatus 11 is mounted by the main pivot mounting 8 to the seed sower 3. The seed sower 3, and apparatus 1 are lowered downwardly so that the ground engaging wheels 15 of the apparatus 1 engage the ground. As the tractor commences to move forward in the direction of the arrow A, the seed sower 3 sows three rows of maize seed in conventional fashion. The front coulters 25 form the furrows 27 and the ground engaging wheels 15 engage in the furrows 27. As the ground engaging wheels 15 rotate, the action of the ground engaging wheels 15 on the roll 2 rotates the roll 2 in the direction of the arrow B. and the film 5 is carried around the peripheral edge of the ground engaging wheels 15, and dispensed from the roll 2. The ground engaging wheels 15 thus locate the side edges of the film 5 in the furrows 27, which as the tractor moves forward are closed by the rear coulters 30, thus entrapping the film material 5 in the furrows 27. Should the apparatus 1 encounter uneven ground, the apparatus 1 is free to pivot about the main pivot axis 9, and the secondary framework 10 is free to pivot about the secondary pivot axis 14 so that the ground engaging wheels 15 continue to engage the furrows 27.

FIGS. 8 to 20 show a second embodiment of an apparatus for dispensing and laying a sheet of film material of the invention.

Figure 8:
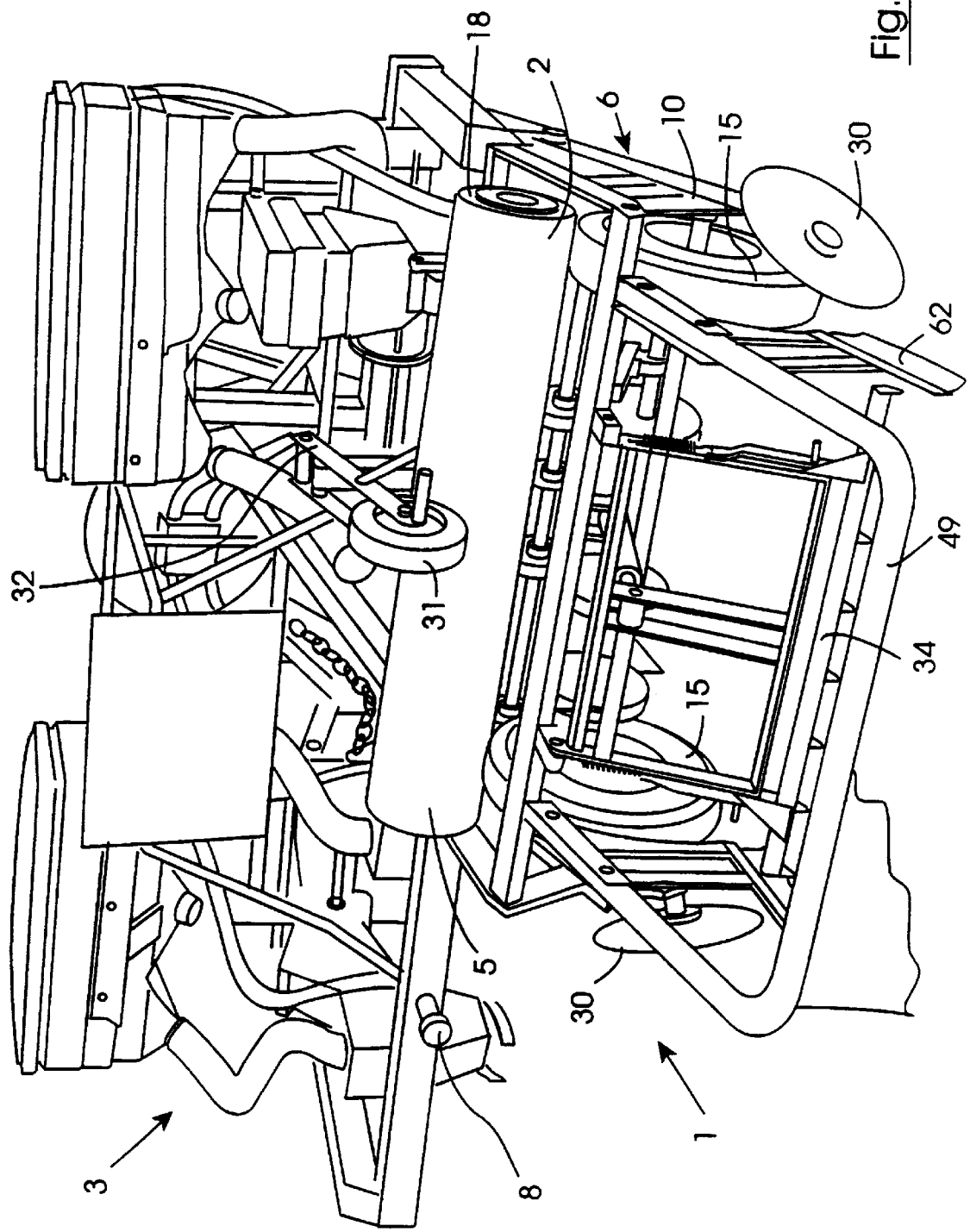
FIG. 8 is a rear perspective view of a second embodiment of an apparatus according to the invention attached to a seed sower with a second seed sower disposed parallel to the first seed sower.
Figure 9:
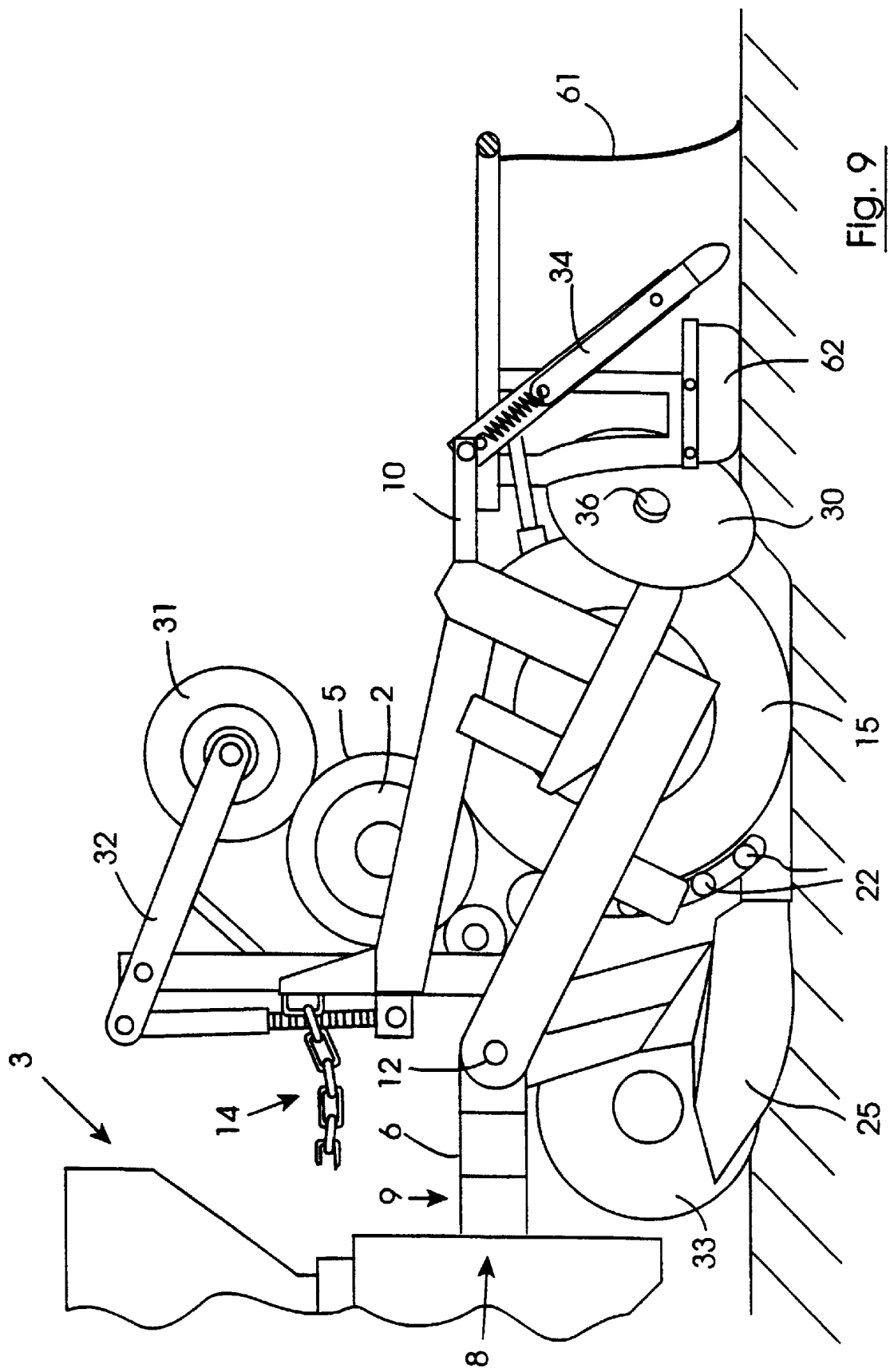
FIG. 9 is a side elevation of the apparatus of FIG. 8 showing the relative positions of the wheels, rollers and idlers of the device with the roller in the operating is position.
Figure 11:
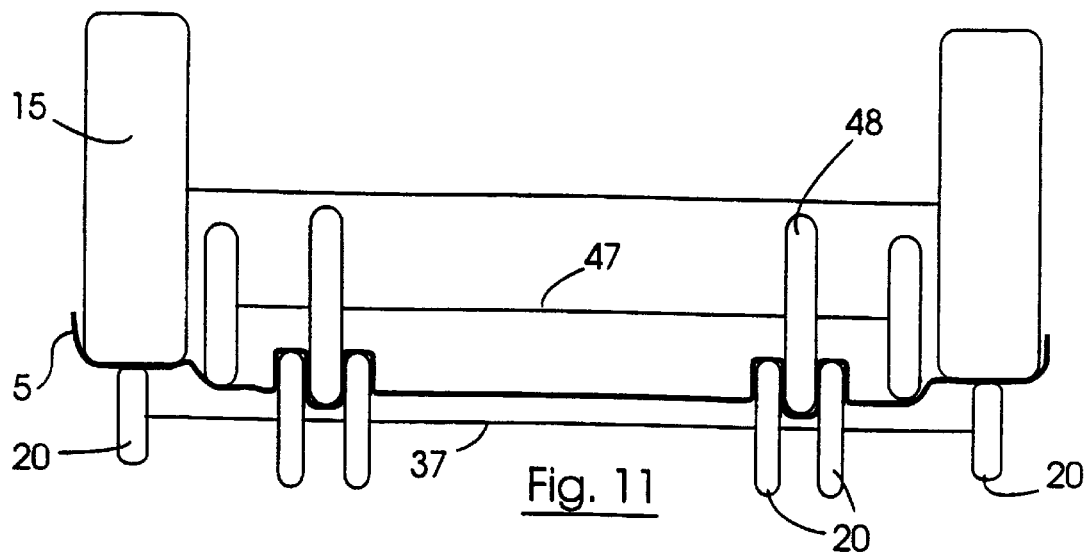
FIG. 11 is a schematic plan view from above of the pressure rollers, support rollers and ground engaging wheels showing the regions in which the sheet material is selectively stretched.
Figure 10:
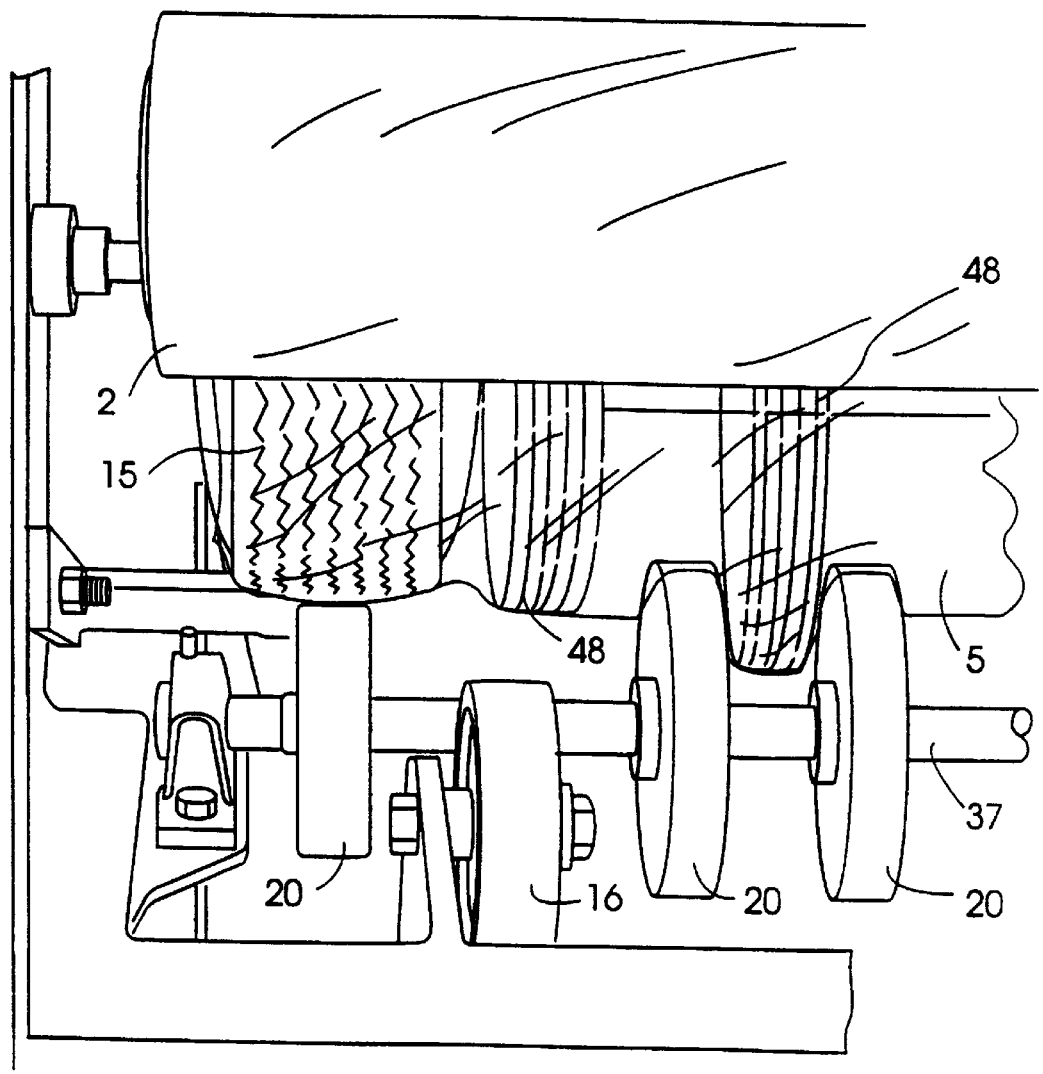
FIG. 10 is an enlarged plan view from above of a portion of the apparatus of FIG. 8 with the roller in the resting position.

As shown in FIGS. 8 and 9, the apparatus of the second embodiment is broadly similar to the apparatus of the first embodiment in that the apparatus, generally indicated by the reference numeral 1 is adapted for mounting rearwardly of a seed sower 3. As shown in FIG. 8, the seed sower 3 is provided with two seed sowers arranged side by side. For clarity, only one of the seed sowers 3 is provided with an apparatus 1 according to the invention. However, it is envisaged that a seed sower 3 as shown in FIG. 8 would normally be provided with two apparatus 1 according to the invention mounted rearwardly of said seed sowers.

The apparatus according to the invention is adapted for dispensing film material 5 from a roll 2. The apparatus 1 is made up of a main framework 6 and a secondary framework 10 carried on the main framework 6.

As shown in the drawings, the main framework 6 is connected by a main pivot mounting 8 to the seed sower 3 so that the apparatus 1 can oscillate or pivot about a main pivot axis 9 defined by the main pivot mounting 8 to facilitate adaptability of the device to rough terrain.

The secondary framework 10 is connected to the main framework 6 by secondary pivot mountings 12 which pivotally connect the secondary framework 10 to the main framework 6.

The secondary pivot mountings 12 define a common secondary pivotable axis 14 about which the secondary frame 10 can pivot as previously described.

The main pivot or oscillating point 8 in combination with the secondary pivot points 12 and their corresponding pivot axis ensure that the apparatus of the invention is highly adaptable to uneven surfaces to ensure that the sheet material 5 is consistently applied to the ground without interruption resulting from uneven surfaces.

The apparatus of the invention has a pair of ground engaging wheels 15 carried on the secondary framework 10 and rotatable about a common rotational axis as previously described. The apparatus is also provided with a retaining wheel 31 carried on a spring loaded pivotably mounted arm 32 to retain the roll 2 in engagement with the ground engaging wheels 15 in use.

The apparatus has a pair of rear coulters 30 carried on the secondary framework 10 as previously described. In the present embodiment, the rear coulters 30 are made up of rotatable disc coulters. The apparatus also comprises a rearwardly mounted cutting knife 34 which shall be described more fully below.

As shown in FIG. 9, the apparatus 1 has a pair of spaced apart front coulters 25 also as previously described. To the rear of the front coulters 25 a soil flattening roller 33 carried by the main frame 6 is visible. The soil flattening roller 33 serves to flatten the soil prior to laying of the plastics sheet material as shall be described more fully below.

A scraper (not shown) is mounted on the roller 33 to effect removal of accumulated soil matter from the roller to ensure smooth operation of the roller.

The secondary framework 10 carries the cutting knife 34 at the rearward end thereof and is attached to the main framework 6 at the front end thereof. The side members of the secondary framework 10 define an L-shaped bracket structure with the foot of the L being disposed in a diagonally upward orientation towards the rear of the apparatus of the invention. The rear coulters 30 are carried on a carrying arm 35 which extends rearwardly of the apparatus from the corner of the L-shaped structure. The disc shaped rear coulters 30 are attached to the carrying arms 35 by bolts 36.

Figure 3:
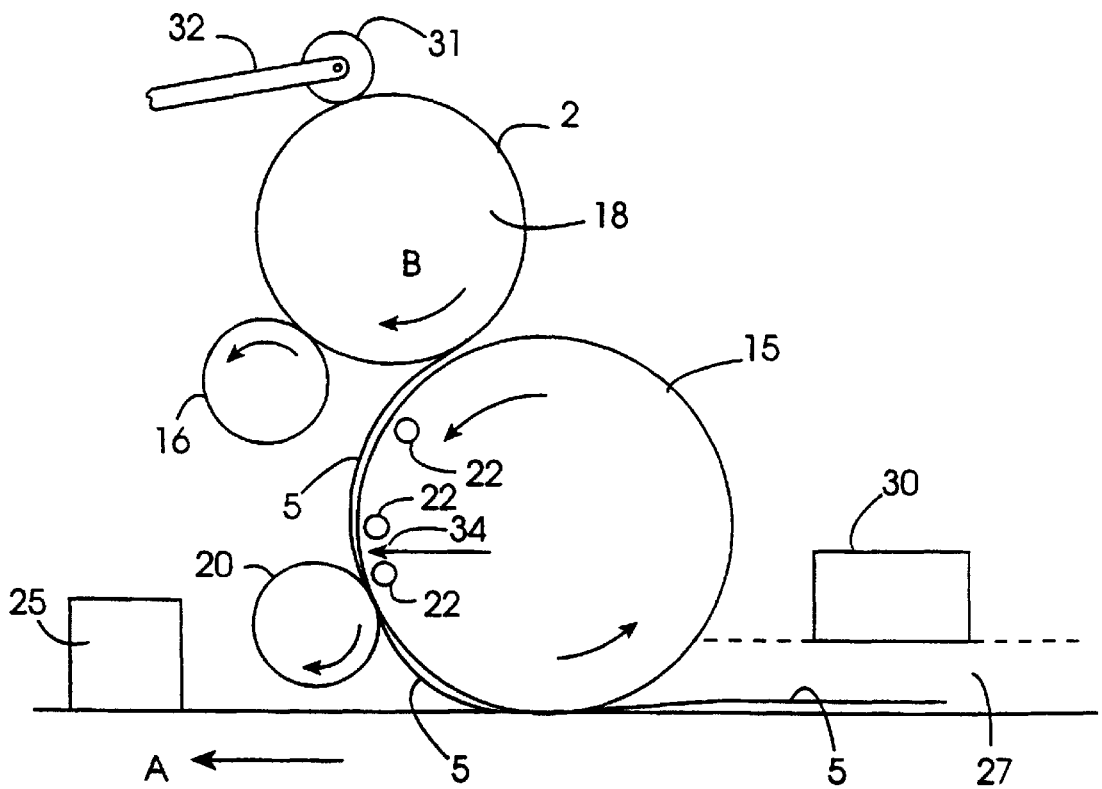
FIG. 3 is a diagrammatic side elevation of the important features of the apparatus of FIG. 1 with the direction of movement of the plastics material indicated by the arrows.
Figure 4:
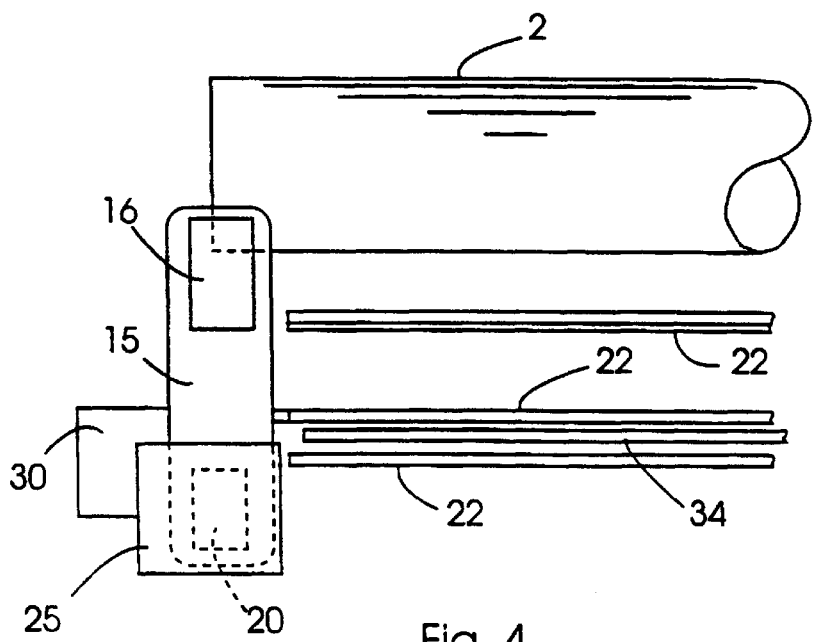
FIG. 4 is a partially cut away diagrammatic front elevation of half the apparatus of FIG. 1 illustrating the support bars and cutting knife of the apparatus.
Figure 5:
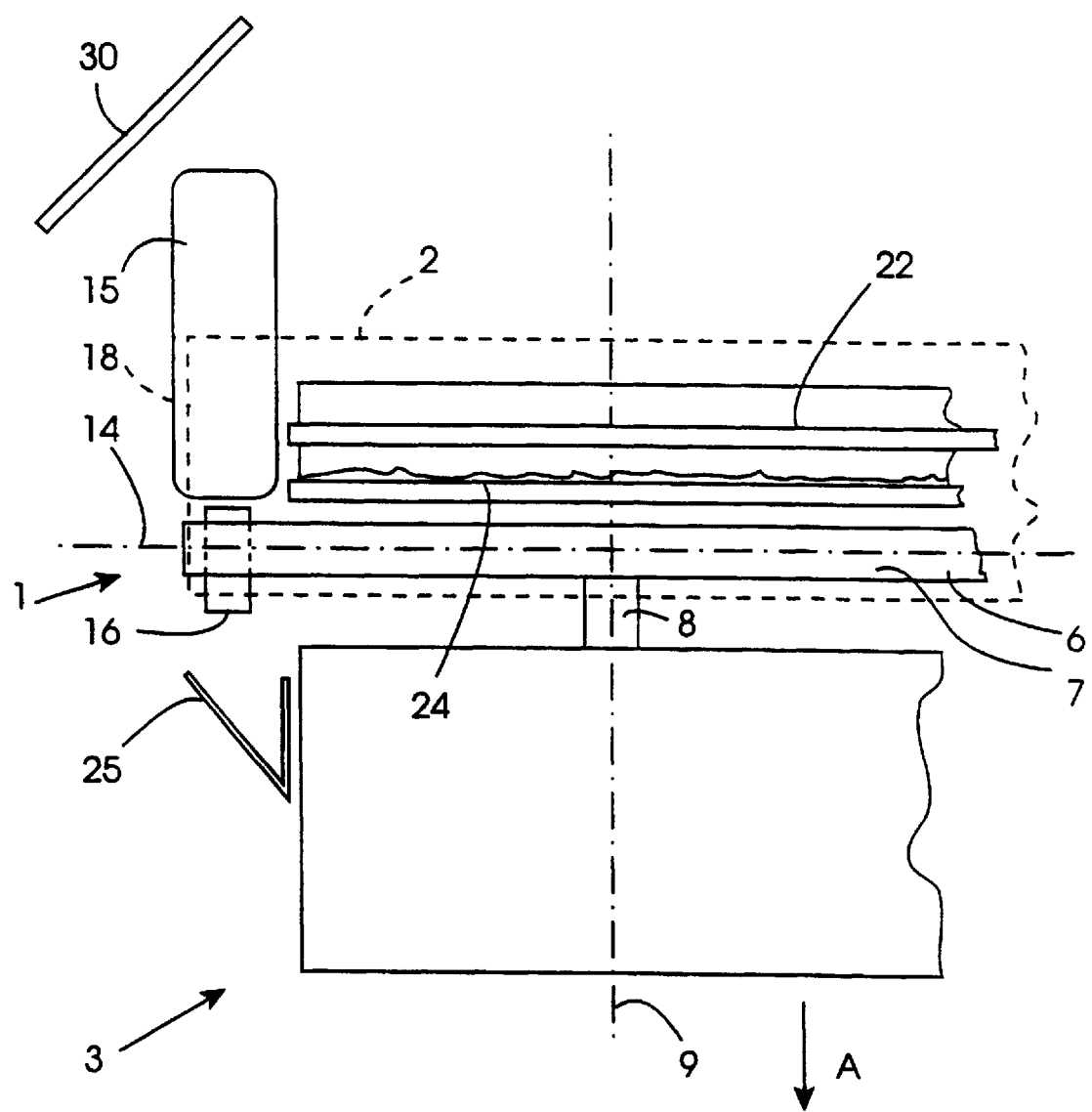
FIG. 5 is a diagrammatic plan view from above of a portion of the apparatus of FIG. 1 illustrating the roll of plastics (in broken lines), the wheels, coulters, main pivot axis and secondary pivot axis of the apparatus.
Figure 6:
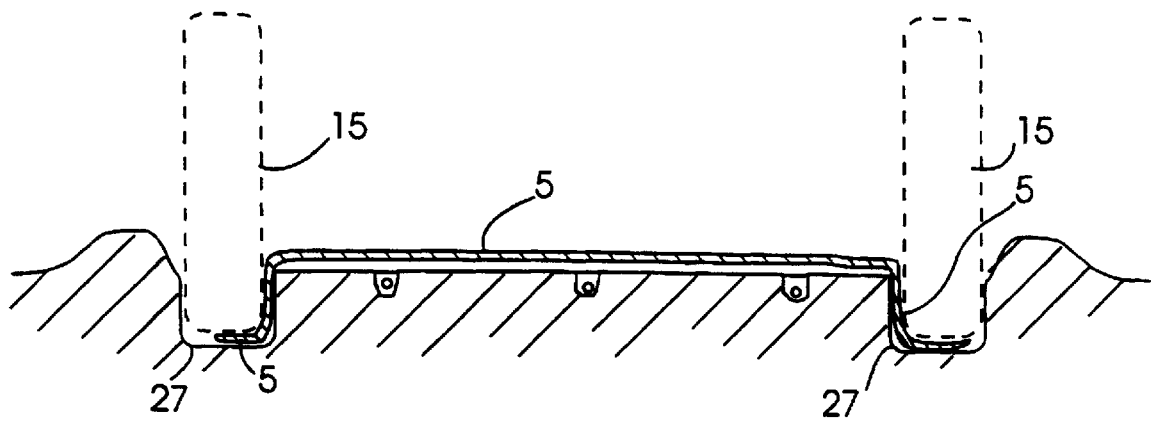
FIG. 6 is a cross-sectional view of the ground illustrating the apparatus of FIG. 1 in use with the wheels shown in broken lines.
Figure 7:
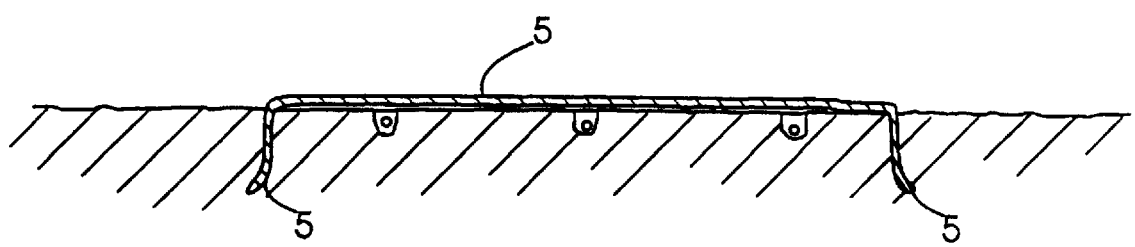
FIG. 7 is a cross-sectional view of the ground illustrating a plastics film having been laid on the ground and secured thereto by the apparatus of FIG. 1.
Figure 12:
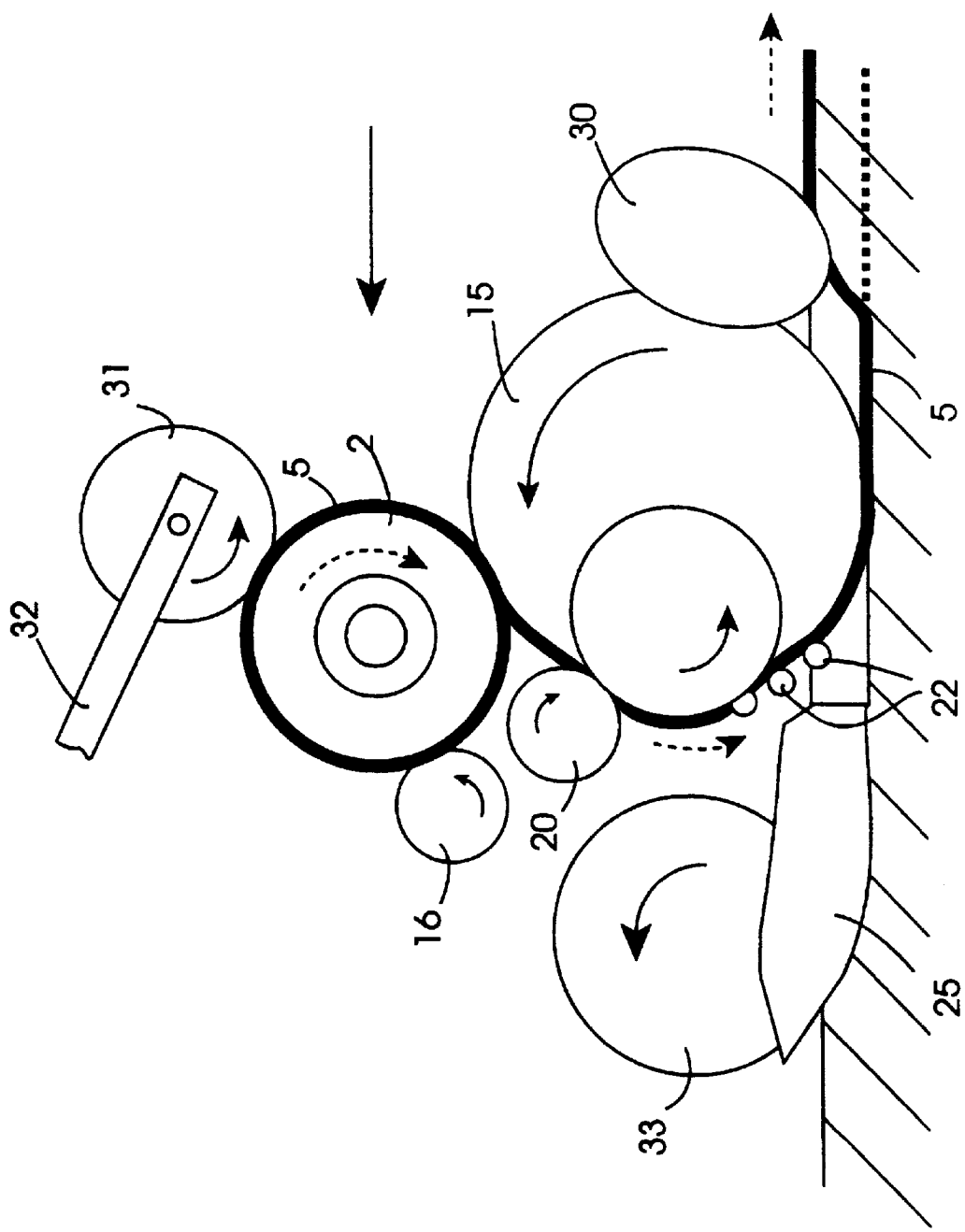
FIG. 12 is a diagrammatic side elevation of the rollers, idlers, support bars, coulters, etc. of the apparatus of FIG. 8 with the direction of movement of the plastics material being indicated by arrows.

As shown in FIGS. 10 to 13, the ground engaging wheels 15, the plastics roll 2, and the idler roller 16 are arranged substantially as previously described in relation to FIG. 3 above. However, in the present embodiment, the retaining wheel 31 is urged against the plastics roll 2 from the rear of the apparatus 1 of the invention. In addition, the pressure rollers 20 are disposed immediately below the idler rollers 16 in the space defined between the plastics film roll 2, the idler roller 16 and the ground engaging wheel 15 as shown in FIG. 12.

Figure 13:
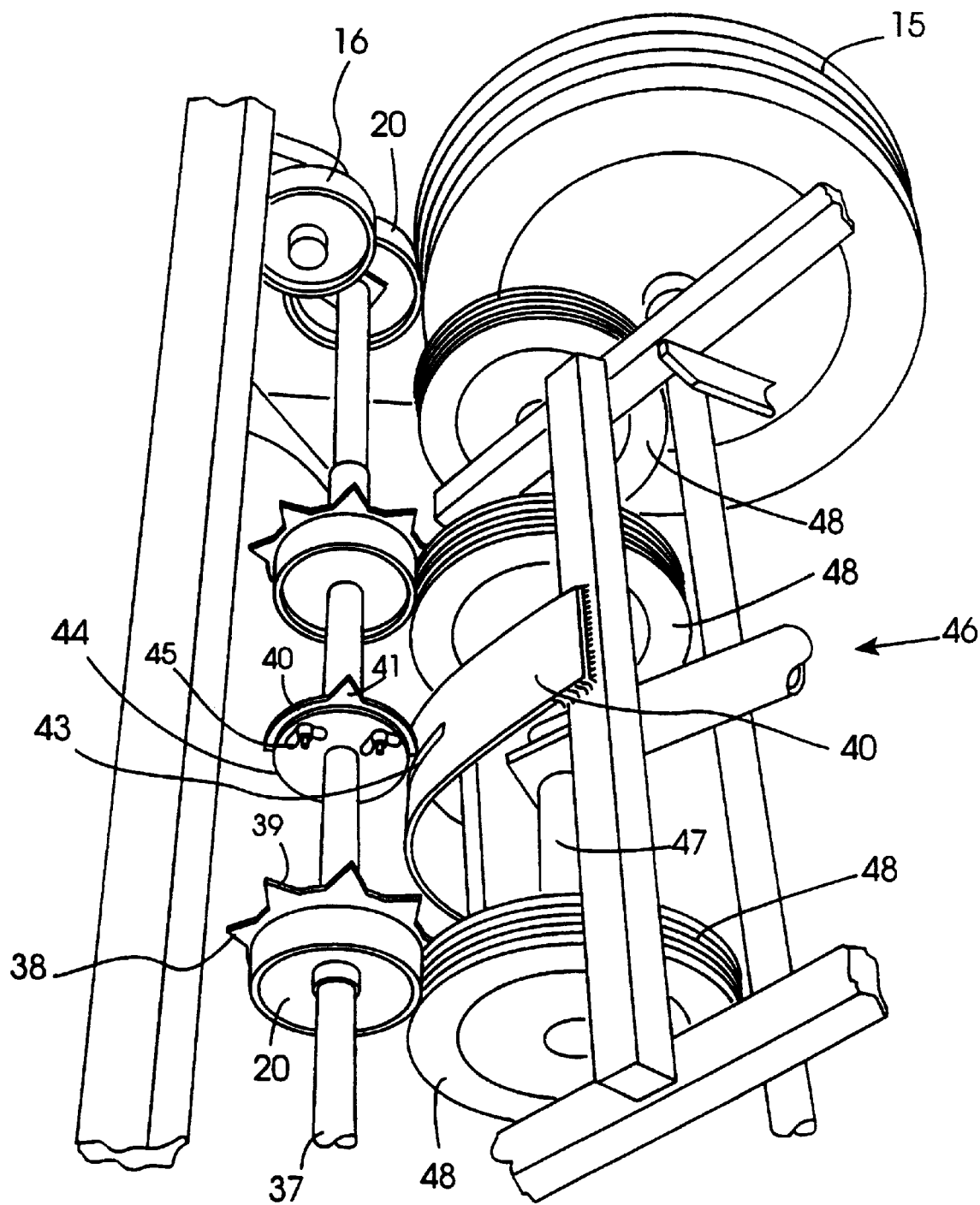
FIG. 13 is an enlarged perspective view of a portion of the idlers, rollers and plastics cutting means of the apparatus of FIG. 8.

As shown in FIG. 13, pressure rollers 20 are carried on a spring urged mounting member 37 pivotally connected at either end by bearings to the secondary framework 10. The pressure rollers disposed at each end of the mounting member 37 are in contact with the ground engaging wheels 15 while the pressure rollers 20 mounted on the mounting member 37 between the ground wheel engaging rollers 20 are of enlarged diameter. The enlarged diameter pressure rollers 20 serve to stretch the sheet material 5 as shall be more fully described below.

In the present embodiment the support bars 22 are made up of rotatable elongate support bearings 22 which roll against the ground engaging wheels 15.

Figure 16:
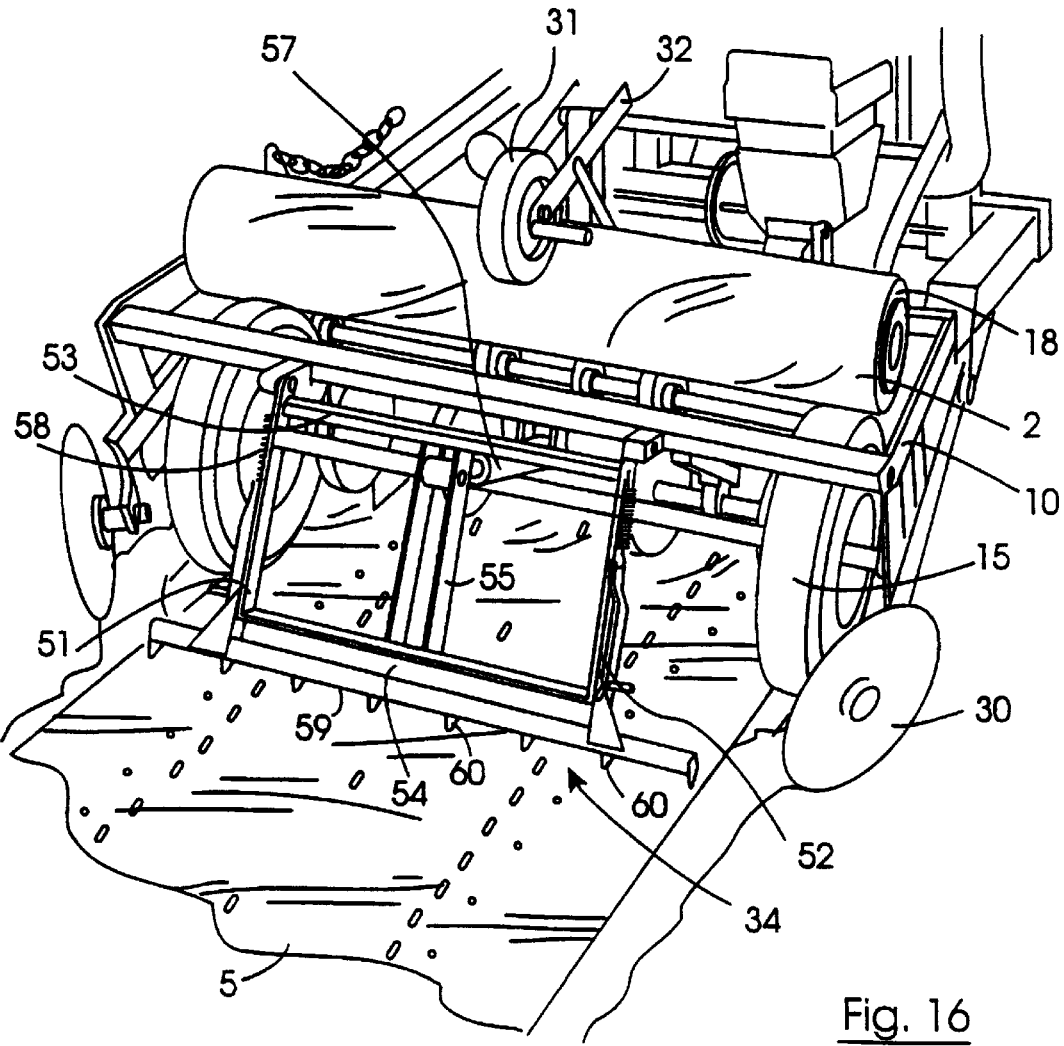
FIG. 16 is a rear perspective view of the apparatus of FIG. 8 with a plastics film laid on the ground and the cutting knife in the resting position.
Figure 20:
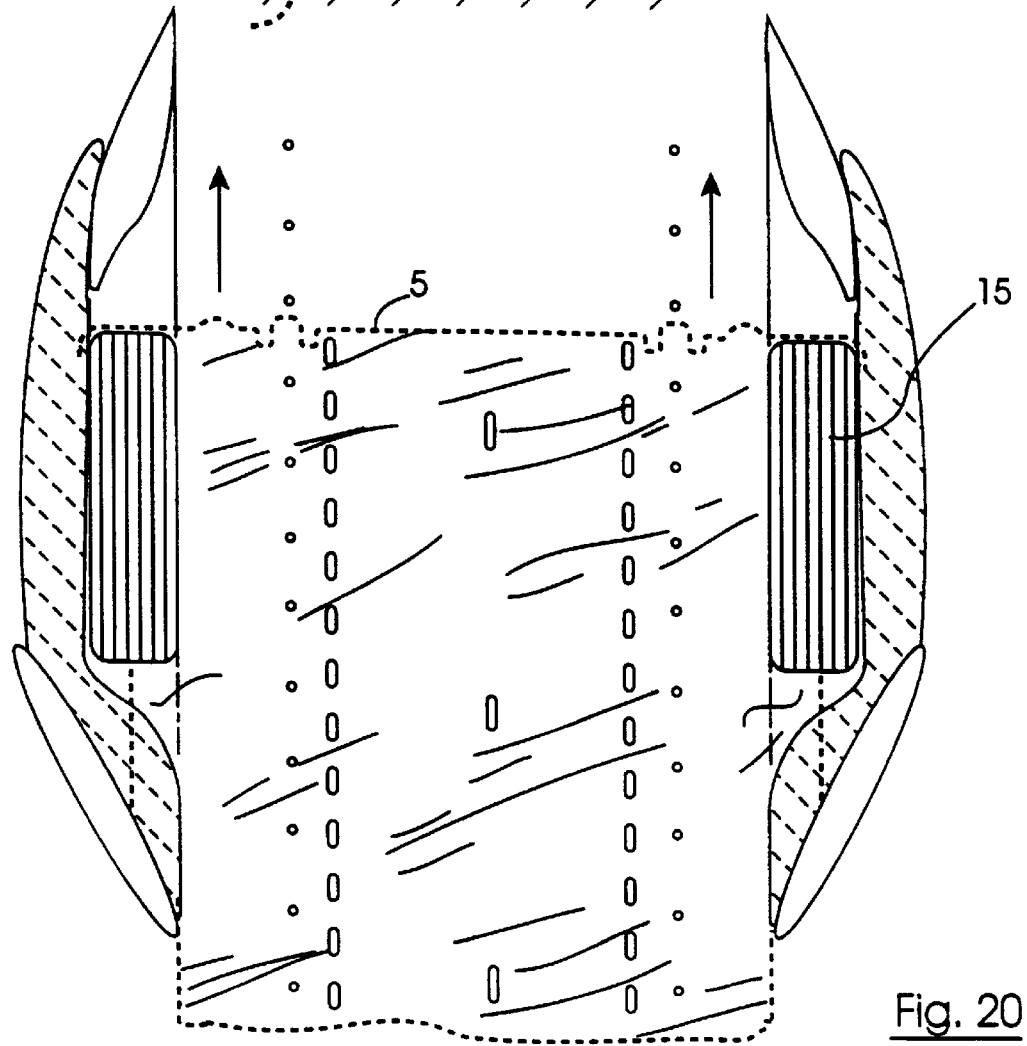
FIG. 20 is a diagrammatic plan view from above of the wheels and plastics sheet of the apparatus of FIG. 8, with the plastics sheet laid on the ground and the direction of movement of the apparatus being indicated by arrows.

The mounting member 37 is further provided with disclike primary punching plates 38 mounted adjacent each pressure roller 20. The punching plates 38 can be integral with the pressure roller 20 or alternatively can be attachments mountable on the mounting member 37 adjacent the pressure rollers 20. The punching plates 38 are provided with a multiplicity of protruding cutting or punching teeth 39. The cutting teeth 39 impart multiple punch holes to the plastics material 5 in use as shown in FIGS. 16 and 20. The multiple punched holes in the plastics material are formed in a continuous series and serve to provide aeration beneath the laid plastics sheeting material to prevent rotting of germinated or ungerminated seed.

The mounting member 37 is further provided with a secondary punching plate 40 disposed centrally between each combination of pressure roller 20 and primary punching plate 38.

The secondary punching plate 40 is provided with a single punching tooth 41. The secondary punching plate 40 rotates with the pressure rollers 20 on the mounting member 37. The secondary punching plate 40 is disposed over a curved cutting plate 42 mounted on the secondary frame 10. The cutting plate 42 is provided with an elongate slit 43 for receiving the single tooth of the secondary punching plate 40 during rotation of the secondary punching plate 40. As shall be explained more fully below, plastics material travelling between the secondary punching plate 40 and the curved cutting plate 42 is punched in the region of the slit 43 by the single tooth 41 of the secondary punching plate 40 extending into the slit 43. Accordingly, the frequency of holes punched by the single tooth 41 of the secondary punching plate 40 is significantly lower as compared with the frequency of the holes punched by the primary punching plate 38.

The holes punched in the plastics sheet material 5 by the single tooth 41 of the secondary punching plate 40 serve to allow surface water accumulated on the plastics sheet 5 following application of the plastics sheeting 5 to the soil to pass through the plastics sheeting 5 into the soil thereby preventing flattening of the plastics sheeting 5 against the surface of the soil and potential damage to or rotting of seedlings or germinated or ungerminated seed.

As shown in FIG. 13, the secondary punching plate 40 is made up of two parts—a first disc 44 permanently mounted on the mounting member 37 and a second detachable disc, the second detachable disc being the secondary punching plate 40 proper. The secondary punching plate 40 is attachable to the permanent disc 44 by butterfly bolts 45.

In the present embodiment, the secondary frame 10 is further provided with a tertiary frame 46 disposed between the wheels 15. The tertiary frame 46 is pivotably mounted on the secondary frame 10 and comprises a transverse bar 47 which extends between the ground engaging wheels 15 parallel to the mounting member 37.

The transverse bar 47 is provided with a series of solid support wheels 48. The solid wheels 48 are arranged on the transverse bar 47 such that a plurality of the solid wheels 48 are urged against a plurality of the pressure wheels 20. However, a number of the solid wheels 48 have an enlarged diameter and are spaced apart along the transverse bar 47 such that the larger diameter solid wheels 48 protrude into a space defined between the enlarged diameter pressure rollers 20 on the mounting member 37.

Interaction between the larger diameter solid wheels 48 and the enlarged diameter pressure rollers 20 serves to stretch the plastics material 5 passing over the larger diameter solid wheels 48 in the area between the enlarged diameter pressure rollers 20 to render the plastics material 5 thinner in said regions to facilitate penetration of the plastics material by plants following laying of the film material.

The cutting plate 42 bearing the elongate cutting slit 43 as previously described is mounted on the tertiary frame 46 such that the external surface of the cutting plate 42 follows the path defined by the outer edge of the solid wheels 48 of smaller diameter.

The direction of movement of the plastics sheet material 5 to be dispensed from the roll 2 can be more fully understood having regard to FIG. 12 which shows a diagrammatic side elevation of the ground engaging wheels 15, plastics roll 2, retaining wheel 31, idler rollers 16, pressure rollers 20, solid wheels 48 and support bearings 22 with solid arrows indicating the direction of movement of the rollers and wheels, and the plastics material and the direction of movement of the plastics material 5 being indicated by heavy lines and broken arrows respectively.

As shown in the drawing, the apparatus 1 for dispensing and laying the sheet of film material 5 is conveyed to the left in the direction indicated by the arrows. Accordingly, the ground engaging wheels 15 are urged forwards in an anti-clockwise direction so that the plastics sheet material 5 is unrolled from the roll 2 in a clockwise direction, the roll 2 being directly mounted in the cradle on the ground engaging wheels 15 in the operative position.

The retaining wheel 31 (which is urged against the roll 2 of plastics material by the biased arm 32) is rotated in an anti-clockwise direction while, similarly, the idler rollers 16 which rest against the underside of the roll 2 of plastics material 5 are urged in an anti-clockwise direction. The plastics material 5 is directed downwards from the roll 2 between the pressure rollers 20 and the ground engaging wheels 15 and the enlarged diameter solid wheels 48.

Figure 17:
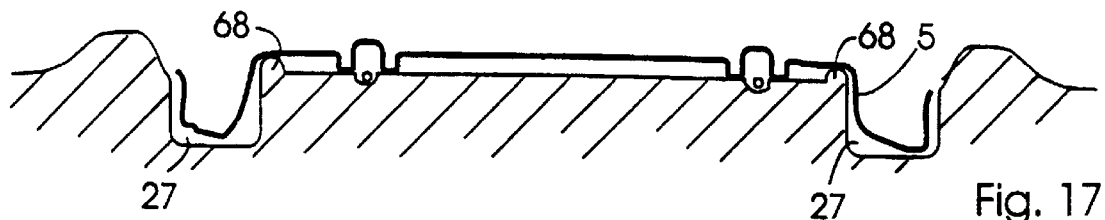
FIG. 17 is a cross-sectional view of the ground following application of a plastics sheet to the ground before covering of the edges of the plastics sheet with soil with stretched portions of the plastics being schematically shown as raised portions over the seeds.
Figure 18:
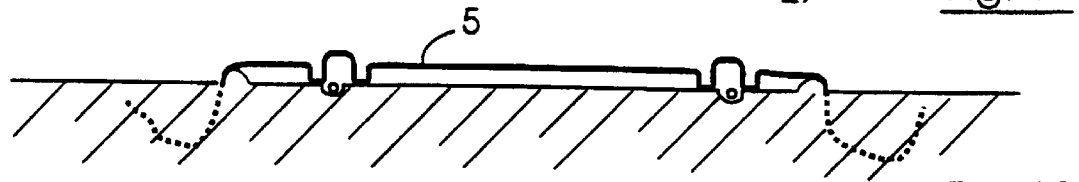
FIG. 18 is a cross-sectional view of the ground of FIG. 17 with the soil covering the sides of the plastics sheet and the plastics sheet being suspended between the raised mounds.
Figure 19:
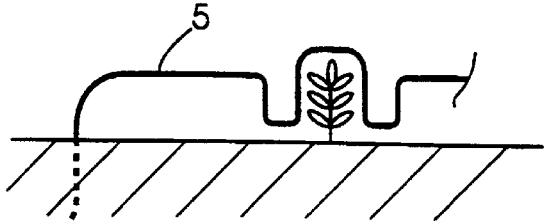
FIG. 19 is cross-sectional view as shown in FIG. 17 with a seedling growing in the stretched region of the plastics.

The ground engaging wheels 15 are disposed such that the edges 18 of the sheet material extend beyond the ground engaging wheels 15 so that the plastics material is urged in its entirety into the soil at its edges to provide a secure anchor as shown in FIGS. 17 and 18. The sheet material is therefore gripped at multiple points during dispensing i.e. between the roll 2 and the ground engaging wheels 15, between the pressure rollers 20 and the ground engaging wheels 15 and between the solid support wheels 48 and the ground engaging wheels 15. Finally, the plastics sheet material 5 is held between the bearings 22 and the ground engaging wheels 15 immediately before entry into furrows 27.

Accordingly, an evenly distributed pressure is exerted on the plastics material 5 resulting in reduced tearing and damage and ease of use of fine gauge plastics sheet material.

In passing between the pressure rollers 20, the ground engaging wheels 15 and the solid wheels 48 the plastics sheet material 5 is simultaneously punched by the primary punching plate 38 and the secondary punching plate 40 as previously described and stretched in the spaces between the pressure wheels 20 by the solid wheels 48 of enlarged diameter.

FIGS. 17 and 18 show schematic representations of the sheet material following laying of the material 5. As shown in the drawings, the sheet material has been selectively stretched to reduce the thickness of the sheet material in the region of the sown seed. For example, a plastics sheet material 5 having a thickness of 6 to 12 microns before stretching could be reduced to a thickness of 3 microns following stretching.

The plastics sheet material 5 is then passed between the three elongate support bearings 22 and the ground engaging wheels 15. The elongate support bearings 22 serve to guide the plastics sheet material against the ground engaging wheels 15 which in turn draw the plastics sheet material 5 from the roll 2 and urge the plastics sheet material 5 against the soil at the edges 18 of the plastics sheet material 5.

Accordingly, in the present embodiment, the plastics sheet material 5 can be controllably and selectively perforated and stretched as required in accordance with prevailing weather conditions and/or the growth conditions required. Similarly, the relative diameters of the support wheels 48, pressure wheels 20 and idler rollers 16 ensure that the plastics material 5 is in no way damaged.

As shown in FIG. 12, the plastics material travels in a clockwise manner from the roll 2 and downwards in an anti-clockwise manner over approximately half the circumference of the ground engaging wheel 15. The plastics sheet material 5 therefore makes comparatively brief contact with the ground engaging wheels 15 but yet sufficient contact to ensure that the plastics material 5 is drawn from the roll 2 and urged into the soil. The degree of contact of the plastics material 5 from the roll 2 with the ground engaging wheels 15 is facilitated by the relative positions of the plastics roll 2, idler rollers 16 and ground engaging wheel 15.

More particularly, the plastics roll 2 is cradled forward of the ground engaging wheels 15 between the ground engaging wheel 15 and the idler roller 16 such that the path travelled by the plastics material 5 during disposing of the plastics material 5 is minimized to avoid uncontrollable and undesired stretching of the plastics material 5.

Figure 14:
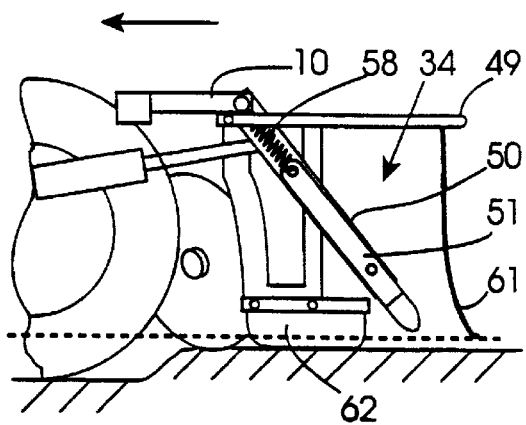
FIG. 14 is a side elevation of the cutting knife and mud flap arrangement disposed to the rear of the apparatus of FIG. 8 with the cutting knife in the resting position.
Figure 15:
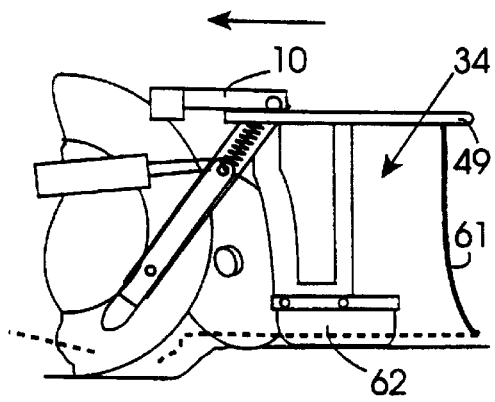
FIG. 15 is a side elevation of the cutting knife of FIG. 14 with the cutting knife in the operating position.

FIGS. 14 and 15 show side elevations of a portion of the embodiment of the invention shown in FIG. 8 and more particularly show an enlarged view of the cutting knife 34. The direction of movement of the apparatus is indicated by an arrow in FIGS. 14 and 15 while FIG. 14 shows the cutting knife 34 in a resting position and FIG. 15 shows the cutting knife 34 in a cutting position.

FIG. 16 which is a rear perspective view from above of the apparatus of the invention clearly illustrating the cutting knife 34. FIGS. 14 and 15 also illustrate a mud flap support frame 49 which extends rearwardly and outwards from the secondary frame 10 of the apparatus of the invention. The mud flap frame 49 is omitted from FIG. 16 for clarity.

As shown in FIGS. 14, 15 and 16, the cutting knife generally indicated by the reference numeral 34 is made up of a pivotable rearwardly extending rectangular frame 50 pivotably mounted on the secondary frame 10 of the apparatus 1 of the invention. The rectangular knife frame 50 is made up of a first side bar 51 and a second side bar 52. The side bars 51,52 are pivotably connected to the rear of the secondary frame 10. The knife frame 50 is further provided with two transverse bars 53,54 to complete the rectangular knife frame 50. A central support bracket 55 made up of two elongate spaced apart bars is disposed between the transverse bars 53,54. The support bracket 55 serves as a mounting bracket to which a hydraulic ram 57 is connected. The hydraulic ram 13 is in turn connected to manually operable control means (not shown). Extension and retraction of the hydraulic ram 57 causes the knife frame 50 to pivot upwards and downwards as shall be explained more fully below.

The knife frame 50 has two biased springs 58 which extend between the transverse bars 53,54 adjacent the outer face of each of the side bars 51,52. The biased springs 58 serve to cause the knife frame 50 to spring return to the resting position shown in FIG. 13 following a cutting action. The spring return movement displaces soil onto plastics sheet material 5 laid to the rear of the apparatus of the invention (see below).

At its end remote from the secondary frame 10, the knife frame 50 is provided with an elongate toothed cutting blade 59. The teeth 60 of the cutting blade 59 are clearly shown in FIG. 16. The teeth 60 are oriented downwards towards the laid plastics material 5.

FIG. 14 shows the knife frame 50 disposed outwards and rearwardly of the apparatus of the invention, i.e. in the resting position. The knife frame 50 is urged rearwardly by the hydraulic ram 57. A cutting motion is achieved by retraction of the hydraulic ram 57 to draw the knife frame 50 inwards towards the front of the apparatus 1 of the invention about the pivot point defined between the side bars 51,52 and the secondary frame 10. Retraction of the hydraulic ram 57 causes the teeth 60 to sever plastics material emerging from beneath the ground engaging wheels 15 in a forwards direction thereby preventing excessive stretching of laid plastics sheet material 5.

Following cutting of the plastics material 5, the biased springs 58 pull the knife frame 50 rearwards to revert to the resting position shown in FIG. 14. The bias provided by the springs 58 causes the knife frame 50 to return to the starting position at speed. During the return movement, the cutting blade 59 strikes the soil behind the ground engaging wheels 15 to urge soil upwards and rearwards onto the free end of severed plastics material 5 to secure the free end of plastics material 5 in position in the soil.

As shown in FIGS. 14 and 15, the mud flap frame 49 is disposed outwards and rearwards from the secondary frame 10 over the knife frame 50. The mud flap frame 49 is provided with a rear end mud flap 61 which extends from the mud flap frame 49 and makes contact with the ground. The rear end mud flap 61 serves to restrict soil thrown upwards following a cutting motion by the knife frame 50 to the region adjacent the free end of the laid plastics material 5.

The mud flap frame 49 is also provided with two side mud flaps 62 (see FIG. 8) at either side disposed downwards and parallel with the ground engaging wheels 15. The side mud flaps 62 serve to prevent excessive soil from being thrown transversely inwards by the coulters 30 during forwards movement of the apparatus of the invention. It is important to prevent excessive coverage of the sheet 5—particularly when the apparatus of the invention is moving at speed.

Figure 21:
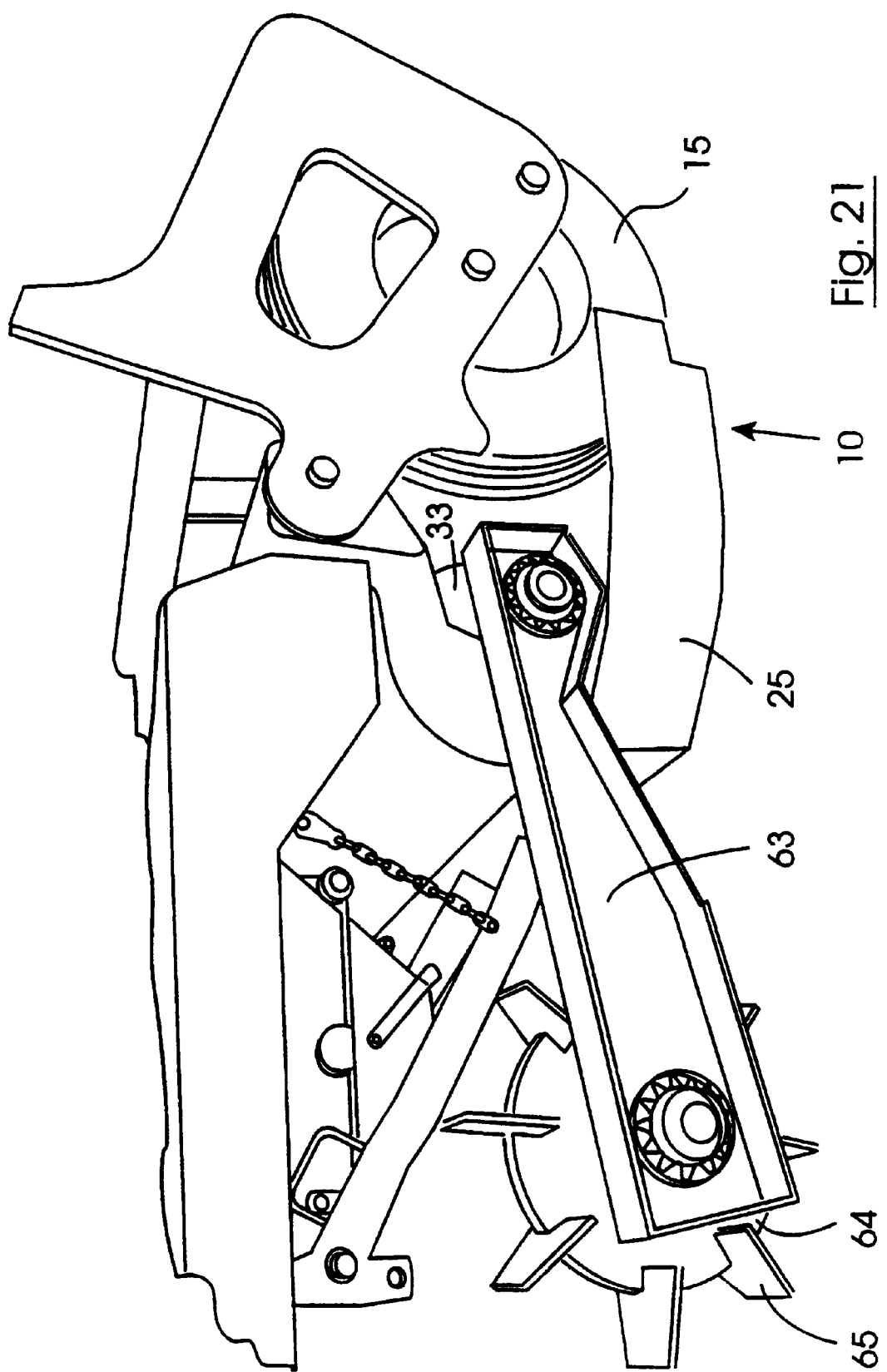
FIG. 21 is a side elevation of a mounting frame for use in the apparatus according to the invention, the mounting frame having a drive wheel for driving a roller for preparing the ground prior to application of the plastics film material.

FIG. 21 shows a side elevation of an alternative secondary mounting frame 10 suitable for use in the apparatus according to the invention.

The mounting frame 10 is adapted to provide a drive means for the roller 33. As shown in the drawing, the mounting frame 10 is attached to the ground engaging wheels 15 and an end mounting of the roller 33. However, the mounting frame 10 is further provided with a carrying arm 63 which extends from the free end of the flattening roller 33 mounting parallel to the direction of movement of the apparatus 1. The arm 63 at its free end is provided with a paddle type rotatable wheel 64 having paddles 65 extending tangentially outwards therefrom. Forwards movement of the apparatus 1 of the invention causes the paddles 65 to engage the ground. The paddles 65 are connected by a gear mechanism (not shown) to the rear of the carrying arm 63 to the flattening roller 33 to drive the flattening roller 33 during forward movement of the apparatus 1.

Rotation of the flattening roller 33 ensures that soil does not build up upon contact with the flattening roller 33 which can disrupt the seed sowing process.

Figure 22:
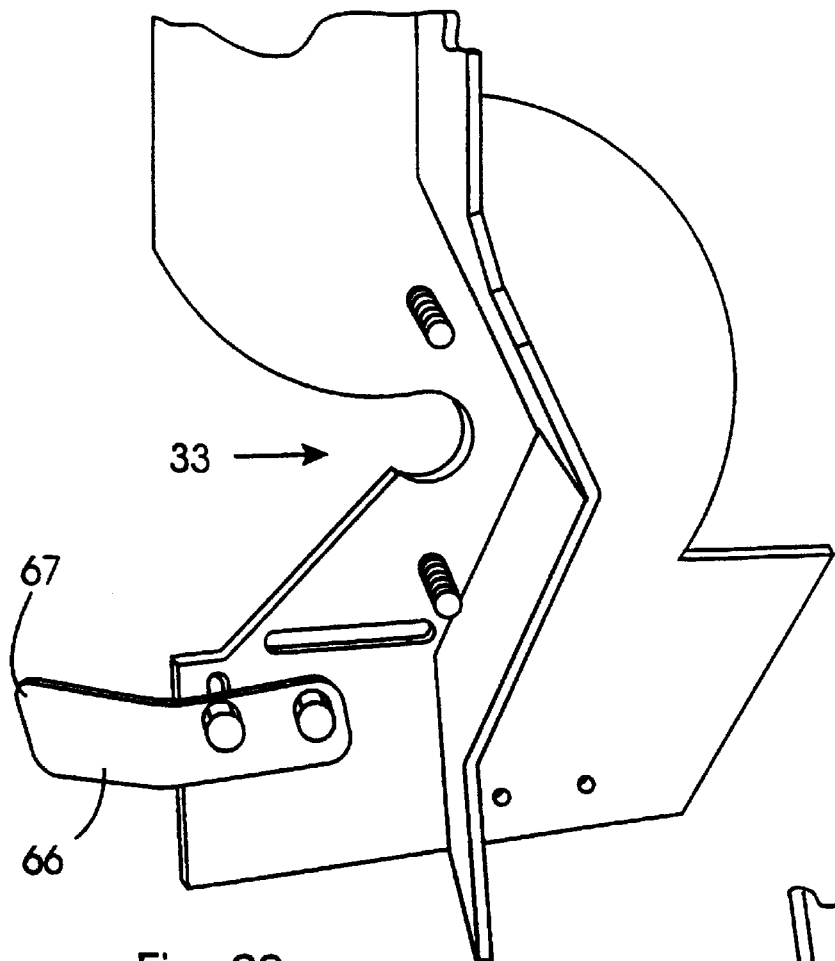
FIG. 22 is a side perspective view of an alternative side mounting bracket incorporating a soil raiser for use in the apparatus of the invention.
Figure 23:
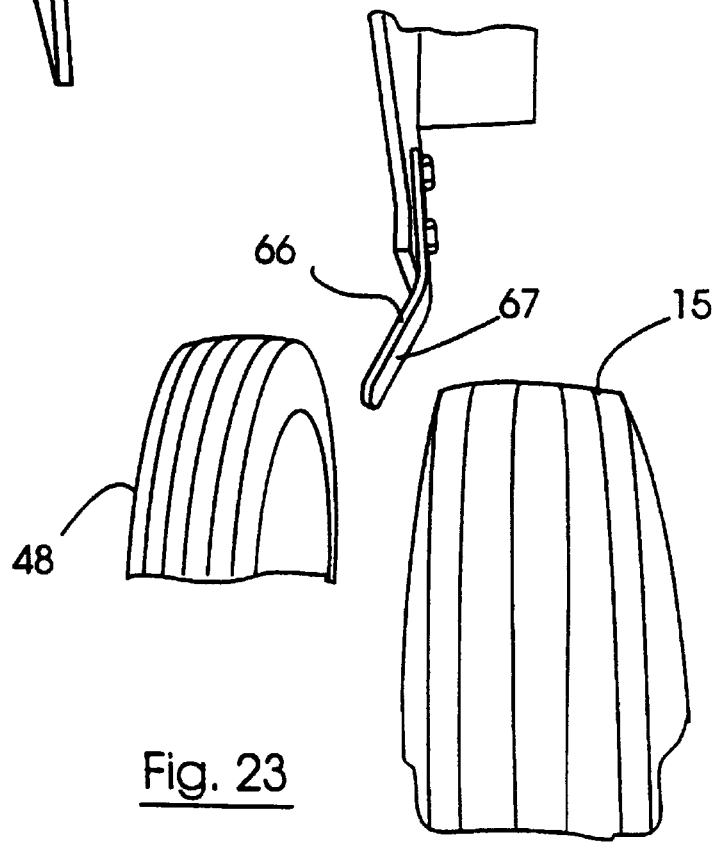
FIG. 23 is a top view of a portion of the mounting bracket of FIG. 22, a ground engaging wheel and a solid support wheel.

FIGS. 22 and 23 show an alternative embodiment of a side mounting for use in the apparatus of the invention. As shown in the drawings, the bracket is provided with a soil raising arm 66 which extends rearwards behind the flattening roller 33 (not shown). The soil raising arm 66 is made up of a finger-like projection having an inwardly hooked or kinked end 67. The kinked end 67 displaces soil inwards and upwards before application of the sheet material to the ground to form a continuous elongate raised mound 68 (see FIGS. 17 and 18) either side of the flattened soil adjacent each furrow 27. Accordingly, following application of the sheet material 5 as hereinabove described, the sheet material is suspended between the two parallel mounds 68.

An advantage of the raised mounds 68 is that the applied sheet does not bear down on the seed/soil thereby allowing air and moisture circulation to encourage growth.

In use (see in particular FIGS. 14 to 20), the seed sower 3 is mounted to the three point linkage of a tractor as previously described. The apparatus of the second embodiment is then mounted at the main pivot mounting 8 to the seed sower 3. Generally, two apparatus 1 will be mounted side by side to two seed sowers 3 as shown in FIG. 8. The seed sowers 3 and the apparatus 1 are lowered downwards so that the ground engaging wheels 15 of the apparatus 1 engage the ground. Forwards movement of the seed sowers 3 causes the seed sowers 3 to sow three rows of seed, for example maize seed, in conventional fashion. The flattening roller 33 flattens the seeds into the soil following sowing of the seeds while the front coulters 25 form furrows 27 in which the following ground engaging wheels 15 travel. Rotation of the ground engaging wheels 15 causes the plastics material 5 to be drawn from the plastics roll 2 as previously described. The ground engaging wheels 15 therefore locate the edges 18 of the plastics material 5 in the furrows 27. The disc like rear coulters 30 urge soil inwards into the furrows 27 to cover the edges 18 of the film material 5 with soil thus entrapping the film material 5 in the furrows 27 as previously described. The cutting knife 34 is then actuated to sever the laid plastics material 5 when required.

Location of the roll 2 in the cradle defined between the idler roller 16 and the ground engaging wheels 15 and the subsequent path travelled by the plastics material 5 ensures that firstly undesirable stretching of the plastics material 5 does not take place, secondly stretching of the plastics material is effected at predetermined locations to facilitate easy penetration of the plastics material by germinated seeds, and thirdly punching of holes in the plastics material 5 by the primary and secondary punching plates 38,40 to provide aeration beneath the plastics material 5 and to prevent surface water from accumulating on the plastics material 5.

Fourthly, the apparatus 1 is free to oscillate and pivot about the main pivot axis 9 and the secondary framework 10 is free to pivot about the secondary pivot axis 14 so that the ground engaging wheels 15 continue to engage the furrow 27 independently of uneven ground conditions.

Finally, the arrangement of the support bearings 22 and pressure rollers 20 together with the ground engaging wheels 15 and idler rollers 16 without the use of a plastics laying roller ensures that damage to the plastics material by pebbles and stones extending upwards from the soil is minimized.

It is also envisaged that a protective plate could be mounted adjacent the support bearings 22 to prevent stones and other materials displaced upwards during travel of the apparatus 1 from penetrating the plastics material and causing damage or undesirable punching thereof.

The apparatus of the invention can be formed from many suitable materials known in the art. Advantageously, the pressure rollers 20 are formed from a nylon material while the support wheels 48 are formed from rubber material.

The apparatus of the invention can be adapted for many uses. For example, the apparatus can be adapted to hold a tank for containing a herbicide or fertilizer. Tubes extending from the tank could be used to automatically spray the soil before and/or after laying of the plastics material. An advantage of spraying is that weed growth beneath the plastics material 5 can be prevented by a herbicide while a herbicide applied following laying of the plastics material can prevent weed growth adjacent the edges of the plastics material 5.

For example, three spray heads can be oriented to spray beneath the sheet material, a further two spray heads can be disposed either side of the plastics material and a further single spray head disposed between two apparatus of the invention when mounted side by side behind two seed sowers.

Similarly, application of a fertilizer can enhance germination and growth of germinated seed beneath the plastics material.

The apparatus of the invention is particularly suited for use with plastics material having narrow gauges, e.g. plastics material having a thickness of less than 10 microns or indeed 6 microns and below.

The invention is not limited to the embodiment hereinbefore described which may be varied in construction and detail.

What is claimed is:

1. Apparatus for dispensing a sheet of film material (5) from a roll (2) and laying the film material (5) on the ground subsequent to sowing seeds by a seed sower (3), the apparatus comprising:
    a main framework (6),
    a main mounting means (8) on the main framework (6) for mounting the apparatus (1) rearwardly of the seed sower (3) relative to the direction of motion of the seed sower (3),
    a secondary framework (10) connected to the main framework (6),
    a rotatable idler means (16) rotatably mounted on the secondary framework (10),
    a pair of spaced apart ground engaging wheels (15) rotatably mounted on the secondary framework (10) and defining with the idler means (16) a receiving means for the roll (2), the ground engaging wheels (15) being located on the secondary framework (10) for engaging the roll (2) adjacent the ends (18) thereof for rotating the roll (2), and for acting as a dispensing and laying means for dispensing film material (5) from the roll (2) and for laying the film material (5) over the ground,
    a support means (22) extending between the ground engaging wheels (15) for supporting the film material (5) between the ground engaging wheels (15),
    a pair of forwardly mounted spaced apart front coulters (25) for forming a pair of respective furrows (27) In the ground for engagement by the ground engaging wheels (15) so that the ground engaging wheels (15) locate side edges (18) of the film material (5) in the respective furrows (27), and
    a pair of rearwardly mounted spaced apart rear coulters (30) for closing the furrows (27) for entrapping the side edges (18) of the film material (5) therein.

2. An apparatus as claimed in claim 1 characterized in that the receiving means for the roll (2) comprises a cradle for receiving a roll (2).

3. An apparatus as claimed in claim 1 characterized in that the receiving means for the roll (2), is disposed forwardly of the ground engaging wheels (15).

4. An apparatus as claimed in any claim 1 characterized in that the main framework (6) is pivotally mountable relative to the seed sower (3) about a main pivot axis (9) for permitting pivotal movement of the apparatus (1) about the main pivot axis (9) to accommodate uneven ground.

5. An apparatus as claimed in claim 4 characterized in that the main pivot axis (9) extends substantially horizontally in a general longitudinal direction parallel to the direction of motion.

6. An apparatus as claimed in claim 4 characterized in that the secondary framework (10) is pivotally connected to the main framework (6) about a secondary pivot axis (14) to facilitate pivotal movement of the secondary framework (10) relative to the main framework (6) about the secondary pivot axis (14) for accommodating uneven ground.

7. An apparatus as claimed in claim 6 characterized in that the secondary pivot axis (14) comprises a substantially horizontal secondary pivot axis (14) extending substantially transversely of the direction of motion.

8. An apparatus as claimed in claim 1 characterized in that the idler means (16) comprises a pair of spaced apart idler rollers (16) rotatably mounted on the secondary framework (10) for rollably engaging the roll (2), the idler rollers (16) being located adjacent to, but spaced apart from the ground engaging wheels (15).

9. An apparatus as claimed in claim 1 characterized in that a pressure means (20) is provided for urging the film material (5) into engagement with the ground engaging wheels (15), the pressure means (20) being located adjacent the ground engaging wheels (15) at a location just before the ground engaging wheels (15) urge the film material (5) into the respective furrows (27).

10. An apparatus as claimed in claim 1 characterized in that the support means (22) comprises at least one transverse bar (22).

11. An apparatus as claimed in claim 11 characterized in that the at least one transverse bar (22) forming the support means extends between the ground engaging wheels (18).

12. An apparatus as claimed in claim 12 characterized in that the at least one bar (22) forming the support means is mounted below the rotational axle of the ground engaging wheels (15) and is located adjacent the perimeter of the ground engaging wheels (15) so that the sheet material (5) can pass between the bar (22) and the ground engaging wheel (15).

13. An apparatus as claimed in claim 1 further comprising at least one support wheel (48) between the ground engaging wheels (15) for supporting the sheet material between the ground engaging wheels (15).

14. An apparatus as claimed in claim 1 further comprising a punching means (38,40) for punching the sheet material for puncturing plant holes in said sheet material.

15. An apparatus as claimed in claim 1 further comprising a cutting means (34) for cutting a sheet (5) from a roll (2) of the sheet material (5).

16. An apparatus as claimed in claim 1 characterized in that the apparatus is adapted for mounting rearwardly of a seed sower (3).

17. Apparatus for dispensing a sheet of film material (6) from a roil (2) and laying the film material (5) on the ground subsequent to sowing seeds by a seed sower (3) the apparatus comprising:
    a main framework (6),
    a main mounting means (8) on tie main framework (6) for mounting the apparatus (1) rearwardly of the seed sower (3) relative to the direction of motion of the seed sower (3),
    a secondary framework (10) connected to the main framework (6),
    a rotatable idler means (16) rotatably mounted on the secondary framework (10), a pair of spaced apart ground engaging wheels (15) rotatably mounted on the secondary framework (10) and defining with the idler means (16) a receiving means for the roll (2), the ground engaging wheels (15) being located on the secondary framework (10) for engaging the roll (2) adjacent the ends (18) thereof for rotating the roll (2), and for acting as a dispensing and laying means for dispensing film material (5) from the roll (2) and for laying the film material (5) over the ground, a support means located between the ground engaging wheels (15) for supporting the film material (5) between the ground engaging wheels (15), a pair of forwardly mounted spaced apart front coulters (25) for forming a pair of respective furrows (27) in the ground for engagement by the ground engaging wheels (15) so that the ground engaging wheels (15) locate side edges (18) of the film material (5) in the respective furrows (27), and a pair of rearwardly mounted spaced apart rear coulters (30) for closing the furrows (27) for entrapping the side edges (18) of the film material (5) therein.

18. An apparatus as claimed in claim 17 characterized in that the support means comprises a support wheel (48) for supporting the film material (5) between the ground engaging wheels (15) and for urging the film material (5) against the ground.

* * * * *